Figure 1:
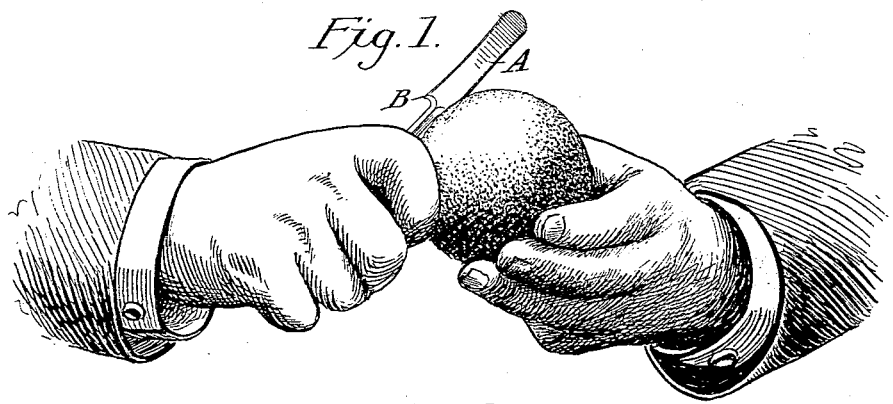

(No Model.)

F. BARR.
ORANGE PEELER.

No. 559,961. Patented May 12, 1896.

Witnesses
Henry W. Tuthill
Frederick J. MacMahon

Inventor.
Frederic Barr
By John F. Kerr
Attorney

UNITED STATES PATENT OFFICE.

FREDERIC BARR, OF PATERSON, NEW JERSEY, ASSIGNOR OF ONE-THIRD TO ABRAM GARRISON, JR., OF SAME PLACE.

ORANGE-PEELER.

SPECIFICATION forming part of Letters Patent No. 559,961, dated May 12, 1896.

Application filed February 4, 1896. Serial No. 578,064. (No model.)

*To all whom it may concern:*

Be it known that I, FREDERIC BARR, of the city of Paterson, county of Passaic, and State of New Jersey, have invented certain new and useful Improvements in Peelers for Removing the Skin from Oranges, Lemons, or other Fruit—in fact, a new article of manufacture—of which the following is a specification.

The object of my invention is to provide a utensil adapted to cut and remove the skin from oranges, lemons, and other fruit which will be neat, simple, durable, and cheap, and which will greatly facilitate the removing of the skin of such fruit without soiling the hands in the operation.

The invention consists of a blade slightly curved at the end, having rounded blunt sides and end, and provided with one or more shoulders and a handle, said shoulders or shoulder to project substantially as shown in the drawings, which form a part of this specification, and being provided with an edge for cutting purposes, substantially as shown.

Figure 2:
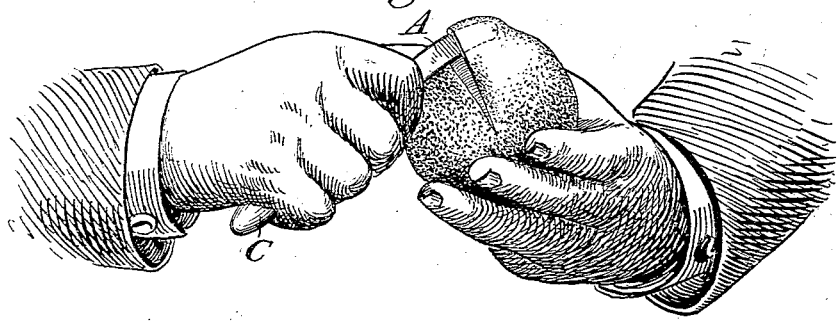
Figure 3:
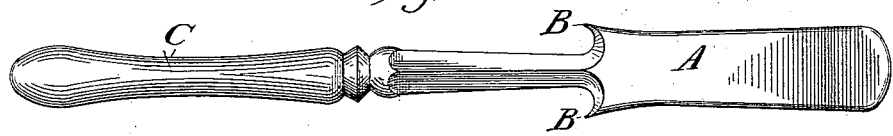
Figure 4:

In the accompanying drawings, in which similar letters of reference indicate like parts, Figures 1 and 2 are views illustrating the method of cutting and peeling an orange with my peeler. Figs. 3 and 4 are top and side views, respectively, of my utensil.

In the drawings, A is the curved blade of the peeler. B B are the edge or cutting portions of the shoulders, and C is the handle. The shoulders on the blade A project to a point which is preferably a dull or round ball-shaped point, the cutting edges being formed by having a portion of the shoulders between said point and the handle or shank sharpened.

As shown in the accompanying drawings, the method of peeling an orange with my invention is as follows: The orange being held in the left hand and the handle of the peeler in the right hand, a cut is made completely around the orange by means of the shoulder provided with the edged portion. The point of shoulder is inserted only to the depth of the skin of the orange, and when the incision has been made in the skin completely around the orange the blade portion A is inserted beneath the skin and gently plies up the skin around the orange until both halves of the skin are removed from the orange clean and dry without having the fingers soiled by the juice of the orange.

Upon the second attempt at the use of my invention the operation of peeling an orange or similar fruit is accomplished with rapidity.

As the blade A has rounded blunt edges and the sharp-edged portions B B are very short and on the inside of the shoulder, it is obvious that the invention is neat, compact, practicable, and not liable to get out of order or to cut the hand of the person who uses it. The shoulders having a round or ball-shaped point, the skin of the orange is easily penetrated therewith and cut without cutting the inside of the orange or causing the juice to escape. The blade and handle may be formed integrally or otherwise, that depending altogether on the cost of the article wanted.

It may be manufactured in different sizes, the blade being composed of any suitable metal and the handle of any design desired without departing from the principle of my invention.

The blade may be nickel-plated, also the handle, or it may be made of sterling silver.

What I desire to claim in this application and to secure by Letters Patent is—

As a new article of manufacture, an orange-peeler, consisting of a handle and a bent, flat, dull-edged blade portion, shoulders formed by the sides of the blade projecting beyond the neck portion of the handle and terminating, each in a dull ball-shaped point, each of said shoulders being provided with a cutting edge between the ball-shaped point thereof and the neck or shank of the handle, substantially as shown and described.

FREDERIC BARR.

Witnesses:
JOHN F. KERR,
D. R. VAN RIPER.